(12) United States Patent
Benjey et al.

(10) Patent No.: US 6,945,290 B1
(45) Date of Patent: Sep. 20, 2005

(54) CHECK VALVE FOR USE IN FILLER TUBE VAPOR RECIRCULATION SYSTEM AND METHOD OF MAKING SAME

(75) Inventors: Robert P. Benjey, Dexter, MI (US); Darryl C. Weber, Ann Arbor, MI (US); Steven H. Verzyl, Ypsilanti, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/864,973

(22) Filed: Jun. 10, 2004

(51) Int. Cl.[7] .................................................. B65B 1/04

(52) U.S. Cl. ...................... 141/302; 141/350; 220/86.2

(58) Field of Search ............................... 141/301, 302, 141/286, 348–350; 220/86.2

(56) References Cited

U.S. PATENT DOCUMENTS

| | | | | |
|---|---|---|---|---|
| 4,044,913 A | * | 8/1977 | Brunnert .................... | 220/86.2 |
| 4,816,045 A | * | 3/1989 | Szlaga et al. ................ | 96/164 |
| 5,735,322 A | * | 4/1998 | Palvolgyi .................... | 141/386 |
| RE37,776 E | * | 7/2002 | Foltz .......................... | 220/86.2 |
| 6,415,827 B1 | * | 7/2002 | Harris et al. ................ | 141/348 |

* cited by examiner

Primary Examiner—Steven O. Douglas
(74) Attorney, Agent, or Firm—Anna M. Shih; Roger A. Johnston

(57) ABSTRACT

A check valve assembly is designed for insertion in an existing fuel tank filler tube having a mechanical nozzle seal and a vapor recirculation port. The insert has an integrally formed ground strap/tab for grounding a refueling nozzle and an attached flexible flapper positioned adjacent the recirculation port by an integrally formed spring tab. The insert has friction tabs for engaging the inner surface of the filler tube for retaining the check valve assembly in the filler tube.

15 Claims, 4 Drawing Sheets

CHECK VALVE FOR USE IN FILLER TUBE VAPOR RECIRCULATION SYSTEM AND METHOD OF MAKING SAME

BACKGROUND OF THE INVENTION

The present invention relates to filler tube assemblies for fuel tank installations of the type having a fuel vapor recirculation tube ported to the upper end of the filler tube in the enlarged nozzle receiving end. Fuel vapor recirculation tubes are employed in motor vehicle fuel tank filler tubes in order to provide vapor recirculation during refueling from a nozzle inserted in the filler tube with a mechanical seal provided about the nozzle. The recirculated vapor provides a make-up flow below the nozzle seal to prevent the flow discharging from the nozzle from creating a vacuum in the filler tube and prematurely activating the automatic nozzle shutoff.

In the aforesaid fuel tank filler tube installations having a vapor recirculation tube attached to a port in the filler tube below the nozzle seal, problems have been encountered where liquid fuel rising in the filler tube, upon the tank becoming filled, has resulted in liquid fuel entering the vapor recirculation tube and flowing into the vapor vent system. Liquid fuel in the vapor vent system can result in blockage of the vapor vent lines by fuel trapped in low regions or in some cases liquid fuel entering into the vapor storage canister causing degradation of the vapor storage medium in the canister.

Thus, it has been desired to provide a way or means of protecting a fuel vapor recirculation system from flow of liquid fuel into the vapor lines and to do so in a manner which is simple and low in cost and does not require substantial reworking or retooling of the fuel tank filler tube.

BRIEF SUMMARY OF THE INVENTION

The present invention provides a solution to the above-described problem of preventing liquid fuel, upon rising in the filler tube when the tank is full, from entering into the vapor recirculation line tapped into the filler tube below the nozzle seal. The present invention employs an insert which may be disposed in an existing filler tube without requiring a rework of the filler tube and includes a flexible membrane or flapper-type check valve attached to the insert for placement in the filler tube prior to attaching the mechanical seal portion of the filler tube. The insert also includes, preferably formed integrally therewith as a single piece, a deflectable ground strap/tab for insuring electrical grounding of the nozzle to the vehicle structure upon insertion of the nozzle into the filler tube and through the filler tube nozzle seal. The check valve of the present invention employs a flexible membrane which is operative to close the vapor recirculation port in the filler tube upon entry of liquid fuel in the upper end of the filler tube. The check valve membrane is nevertheless sufficiently flexible to open under slight vapor pressure in the recirculation tube and thus permits flow of vapor into the filler tube for proper vapor recirculation. A spring tab, preferably integrally formed with the insert, positions the membrane adjacent the recirculation port.

DETAILED DESCRIPTION OF THE INVENTION

Figure 2:
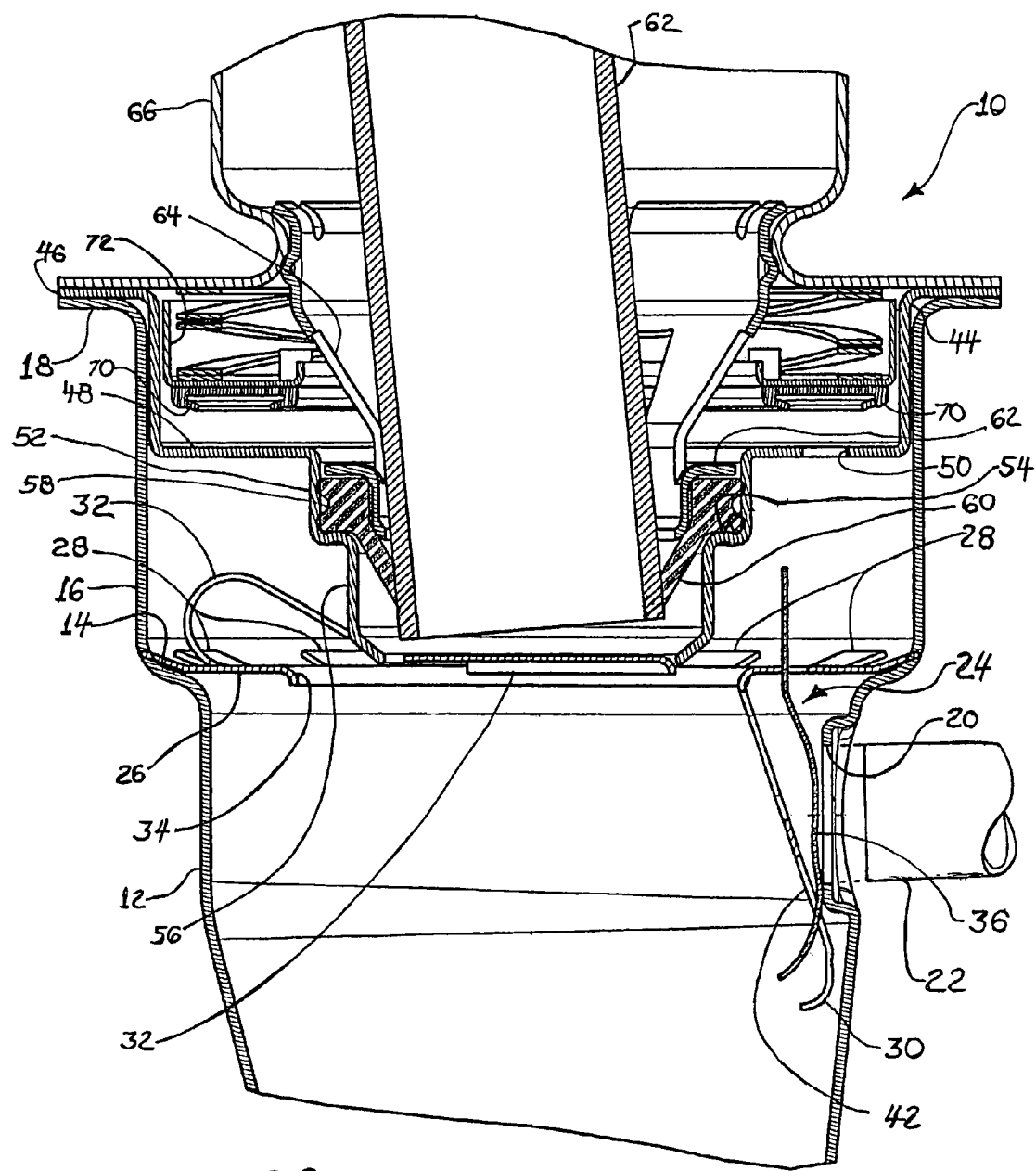
FIG. 2 is a cross-section of the upper end of a tank filler tube employing the present invention with the vapor vent port valve in the closed position.
Figure 3:
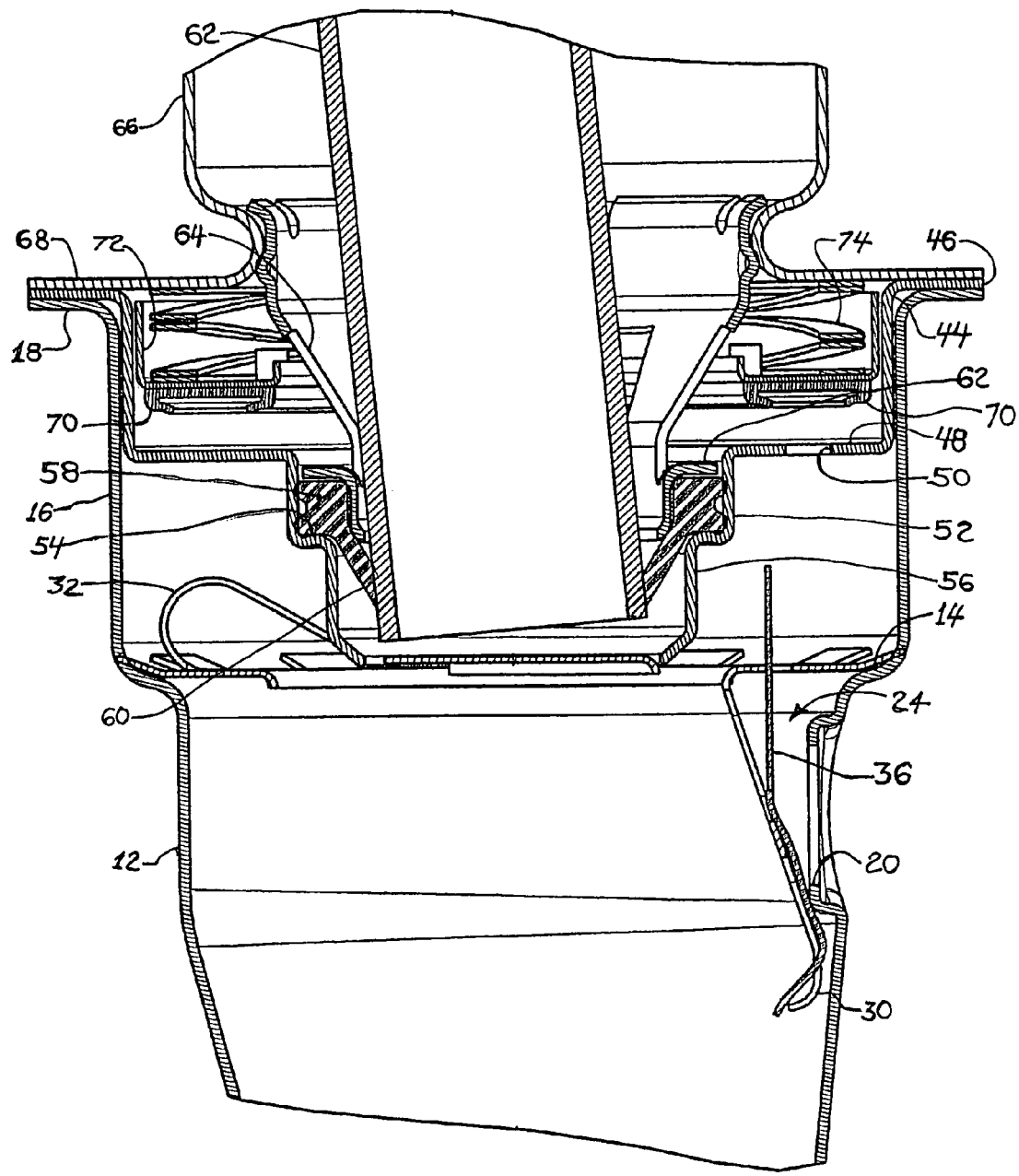
FIG. 3 is a view similar to FIG. 2 showing the vapor vent port flapper in the open position; and, FIG. 4 is a view similar to FIG. 2 showing the refueling nozzle fully inserted so as to make contact with the ground strap/tab.

Referring to FIGS. 2 and 3, the present invention is shown embodied in a fuel tank filler tube as indicated generally at 10 with the upper end of the filler tube denoted by reference number 12. An annular step or shoulder 14 is formed on the tube 12 which transitions the tube to an enlarged diameter portion 16 having an outwardly extending flange 18 formed at the upper end thereof. The tube 12 has a recirculation port or aperture 20 formed therein which is adapted for having a recirculation tube 22 connected thereto as is well known in the art of fuel tank vapor systems.

A combination vapor check valve and ground strap assembly is indicated generally at 24 and includes an annular plate 26 having a plurality of friction tabs 28 formed about the circumference thereof. Upon installation of the assembly 24 in tube 16, tabs 28 frictionally engage the inner surface of the wall of the tube portion 16 to maintain the insert against the shoulder 14. The insert plate 26 has formed, preferably integrally therewith, a downwardly extending spring-like holder or tab 30, the function of which will be described hereinafter in greater detail. The insert plate 26 also has provided thereon, and preferably formed integrally therewith, a ground strap/tab 32 which is folded back on itself to form a U-shaped spring and extends over the central aperture 34 formed in the insert plate 26. It will be understood that the aperture 34 is sized to be a clearance hole to permit downward deflection of the end tab 32.

The check valve assembly 24 includes a flexible membrane or flapper 36 which is attached to the insert plate 26 for free pivotal movement with respect thereto and extending in an downward direction therefrom in the present practice of the invention.

Figure 1:
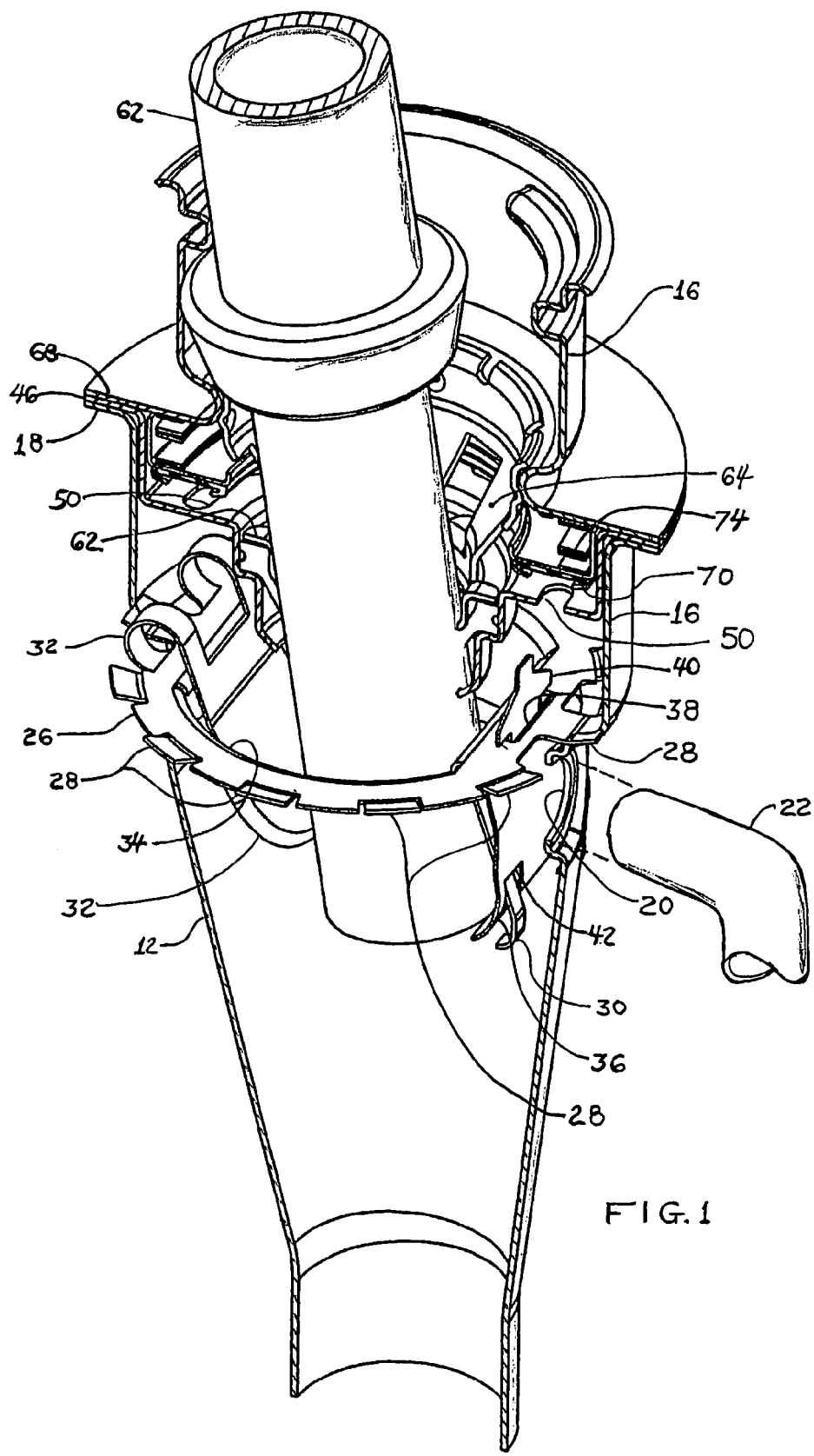
FIG. 1 is a broken away axonometric or perspective view of the filler tube assembly for a fuel tank employing the present invention showing a refueling nozzle inserted therein.

Referring to FIG. 1, a slot 38 is formed in the insert plate 26; and, a portion of the membrane 36 as a pair of oppositely outwardly extending tabs 40 formed thereon such that when the membrane is folded and inserted through the slots and released the tabs extend outwardly over the ends of the slot retaining the membrane therein in a loosely fitting arrangement permitting free pivotal movement thereabout.

The membrane 36 has cutouts therein, one of which is illustrated in FIG. 1 and denoted by reference numeral 42 and has a finger portion of spring 36 extending therethrough to maintain the flapper in close proximity to the recirculation port 20.

The check valve 24 is shown in the closed position in FIG. 2 with flapper 36 held against the recirculation port 20; and, it will be understood that in the event liquid fuel rises in the filler tube to the level of the port 20, the membrane is operative to seal first against the lower portion of the rim of port 20 and then as the fuel rises further to seal completely about port 20, thereby preventing liquid fuel from entering vapor recirculation port 20 and the conduit 22.

Referring to FIG. 3, the valve 24 is shown in the open position with membrane or flapper 36 moved away from the port 20 by the force of vapor entering the port 20 from recirculation tube 22 (not shown in FIG. 3). The movement of the membrane or flapper 36 in the direction away from port 20 is attenuated or arrested by the spring tab 30 as shown by the position of the membrane 36 in solid outline in FIG. 3. In the presently preferred practice of the invention the membrane or flapper 36 is formed of elastomeric material of the type resistant to motor fuel; however, other suitable materials, as for example, plastic may be employed.

Referring to FIGS. 1, 2 and 3, the upper portion 16 of the filler tube has inserted therein an annular stepped insert 44 which has an outwardly extending flange 46 which is superimposed over flange 18 and registered thereon. Insert 44 has an annular shoulder 48 which has formed therein a plurality of pressure relief ports 50 spaced circumferentially thereabout. The inner diameter of the shoulder 48 is connected to a reduced diameter portion 52 which has formed therewith an annularly inwardly extending shoulder 54 which is joined at its inner diameter with a tubular end portion 56 of the insert. The shoulder 54 has inserted thereon the bead rim 58 of an annular lip seal 60 which is sized and configured to seal about the periphery of a refueling nozzle 62 when the nozzle is inserted therein. The bead rim 58 of the seal 60 is retained on the insert shoulder 54 by an annular insert or collar 62 which is retained by a conical insert 64 and which is in turn retained by a tubular collar 66 having an outwardly extending flange 68 thereon which overlies the flange 46. It will be understood that the three flanges 18, 46, 68 may be joined by any suitable expedient as, for example, peripheral weldment to retain the assembly.

An annular pressure relief valve having elastomeric seals 70 provided thereon is denoted by reference numeral 72 and is disposed about the shoulder 48 and member 72. Seal members 70, 72 are biased downwardly by a suitable spring arrangement denoted by reference numeral 74 for closing ports 50.

Figure 4:
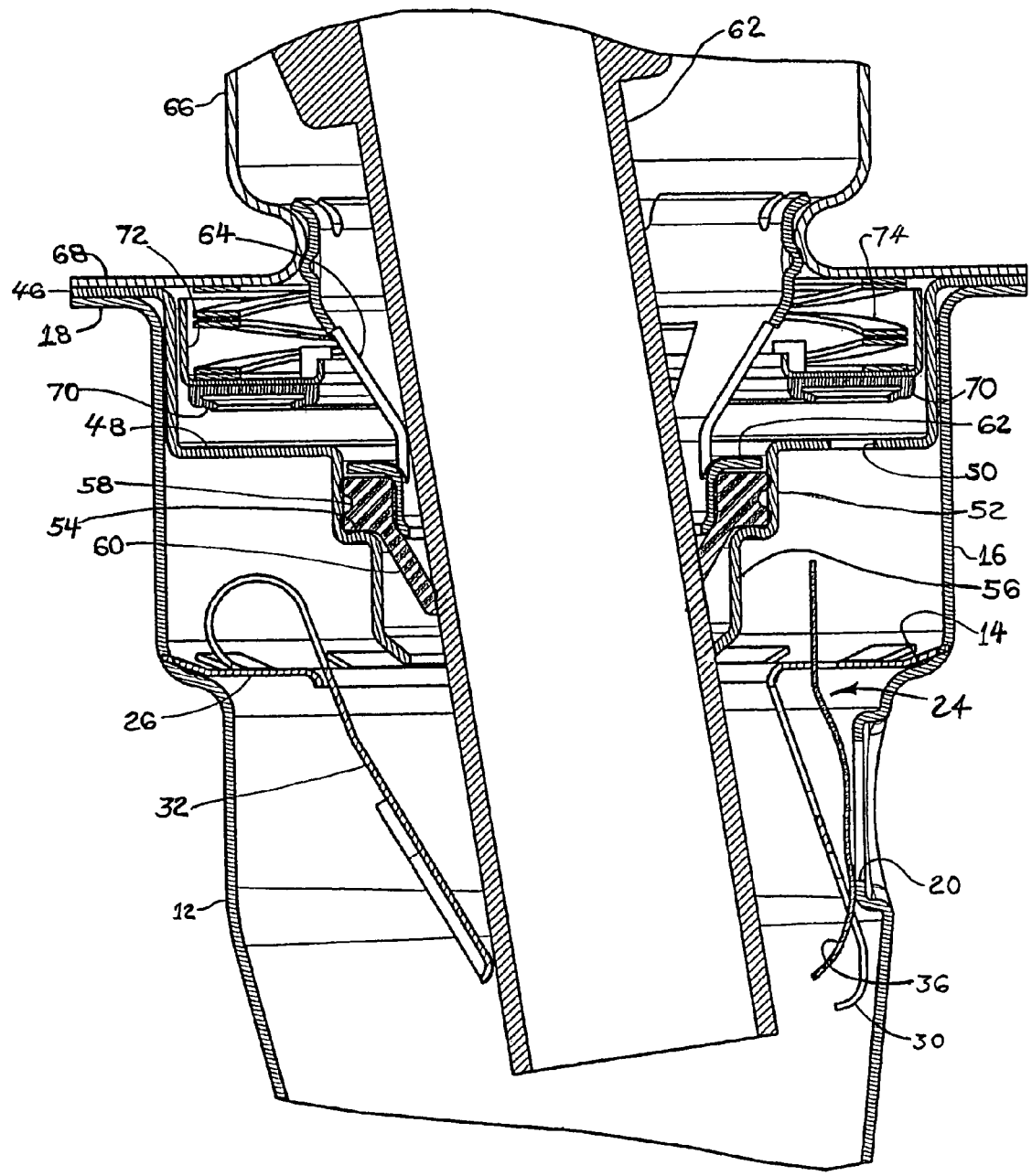

Referring to FIG. 4, the flapper valve 24 is shown in the partially closed condition; and, the refueling nozzle 62 is shown in the position fully inserted having engaged and deflected downwardly the ground strap/tab 32 so as to maintain electrical contact between the ground strap with the refueling nozzle as is also shown in FIG. 1.

The present invention thus provides a one-way check or flapper valve for closing the vapor vent recirculation port in a fuel tank filler tube and which is formed as an insert subassembly which may be inserted in an existing filler tube without requiring modification or retooling of the tube. The one-way valve assembly includes an integrally formed deflectable ground strap/tab for grounding the refueling nozzle and an integrally formed spring tab for positioning the flexible flapper closely adjacent the vapor recirculation port.

Although the invention has hereinabove been described with respect to the illustrated embodiments, it will be understood that the invention is capable of modification and variation and is limited only by the following claims.

What is claimed is:

1. A fuel tank filler tube assembly for use in a tank fill system employing fuel vapor recirculation comprising:
   (a) a tubular member with an enlarged diameter end for receiving a refueling nozzle and having a vapor recirculation cut-out formed in the wall of said enlarged end;
   (b) a flapper formed of flexible material associated with said cut-out and moveable therein for opening and for closing said port; and,
   (c) means positioning said flapper for closing said cut-out wherein said flapper upon being contacted by liquid fuel rising in the tubular member, in the closed position substantially prevents passage of liquid fuel from said tube permits fuel vapor flow into said tube.

2. The assembly defined in claim 1, wherein said means positioning said flapper includes a spring member extending from an insert in said tubular member.

3. The assembly defined in claim 1, wherein said means positioning said flapper includes a pair of spring fingers.

4. The assembly defined in claim 1, wherein said means positioning said flapper includes a pair of spring fingers resiliently positioning the flapper with respect to said cut out.

5. The assembly defined in claim 1, further comprising a grounding strap/tab disposed in said tubular member and contacting a nozzle upon insertion in said tubular member.

6. The assembly defined in claim 5, wherein said flapper is attached to an insert.

7. The assembly defined in claim 1, wherein said insert includes an integrally formed spring biasing said grounding strap/tab.

8. A method of making a fuel tank filler tube for use in a system with fuel vapor recirculation comprising:
   (a) forming a tubular member with an enlarged end for receiving a refueling nozzle and forming a cut-out in the enlarged end for vapor recirculation;
   (b) disposing a flexible flapper for movement between an open and closed position with respect to the cut-out; and,
   (c) moving the flapper to the closed position upon contact by liquid fuel rising in the tubular member and preventing flow of liquid fuel in the tubular member through the cut-out and permitting flow of fuel vapor through the cut-out into the enlarged end.

9. The method defined in claim 8, wherein said step of disposing a flexible flapper includes attaching the flapper to an insert and disposing the insert in said enlarged end.

10. The method defined in claim 8, wherein said step of disposing a flapper includes forming an insert with a grounding strap and attaching said flapper to said insert and disposing the insert in said tube.

11. The method defined in claim 8, wherein said step of disposing a flapper includes forming a spring integrally with the insert and contacting the flapper with the spring.

12. The method defined in claim 8, wherein said step of disposing a flapper includes providing an insert and attaching the flapper to the insert and disposing the insert in the enlarged end of said tubular member.

13. The method defined in claim 12, wherein said step of positioning the flapper includes forming a spring integrally with the insert.

14. The method defined in claim 12, wherein said step of providing an insert includes providing a grounding strap/tab for contacting a nozzle upon insertion of same in said enlarged end of said tubular member.

15. The method defined in claim 14, wherein said step of providing a grounding strap/tab includes forming same integrally with said insert.

* * * * *